United States Patent [19]

Hedges et al.

[11] 4,339,798
[45] Jul. 13, 1982

[54] REMOTE GAMING SYSTEM

[75] Inventors: Richard A. Hedges, Oakland; David L. Shockley, San Francisco; Stanley C. Fralick, Saratoga; Paul H. Kane, Cupertino, all of Calif.

[73] Assignee: Remote Dynamics, Oakland, Calif.

[21] Appl. No.: 104,275

[22] Filed: Dec. 17, 1979

[51] Int. Cl.$^3$ .............................................. G06F 15/28
[52] U.S. Cl. .............................. 364/412; 273/138 A; 340/323 R
[58] Field of Search ............... 364/410, 412, 900, 518, 364/521; 273/138 A, 138 R, 142 D, 274; 340/323 R; 235/92 GA; 358/93

[56] References Cited

U.S. PATENT DOCUMENTS

| | | | |
|---|---|---|---|
| 3,786,234 | 1/1974 | Trent et al. | 364/412 |
| 3,810,627 | 5/1974 | Levy | 235/92 GA |
| 3,876,208 | 4/1975 | Wächtler et al. | 273/138 A |
| 4,108,361 | 8/1978 | Krause | 364/412 |

OTHER PUBLICATIONS

"Play TV Roulette-Win $1, $10, $100", Advertisement, 1971.

Primary Examiner—Errol A. Krass
Attorney, Agent, or Firm—Townsend and Townsend

[57] ABSTRACT

A remote gaming system for use with a wagering or gambling establishment such as a casino to enable a player's participation in a selected one of a plurality of wagering games from a remote location. The system includes a croupier station, a credit station and a player station remotely located from the croupier station and the credit station. The player station includes a live game display for displaying a selected one of a plurality of games being played at the croupier station, such as craps, roulette or keno. The player station includes a changeable playboard for displaying a selected one of a plurality of wagering possibilities corresponding to a selected one of the plurality of games being played and for displaying the results of the game played at the croupier station. The player station also includes a microprocessor for controlling the operation of the live game display and the changeable playboard.

10 Claims, 19 Drawing Figures

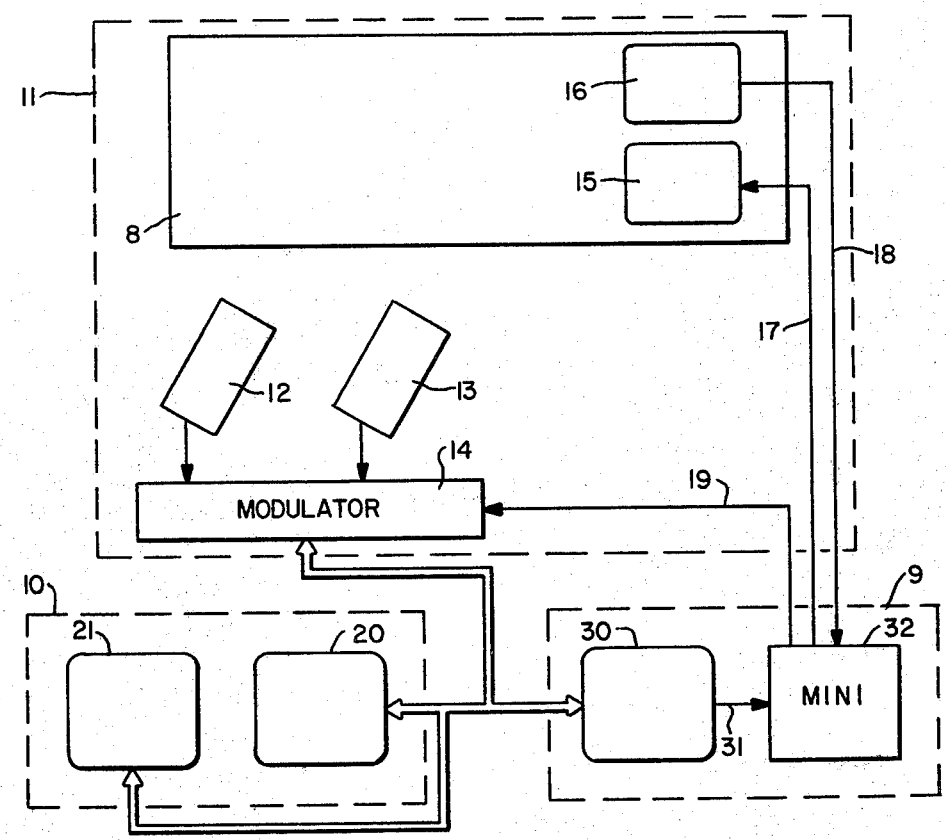
FIG.—1
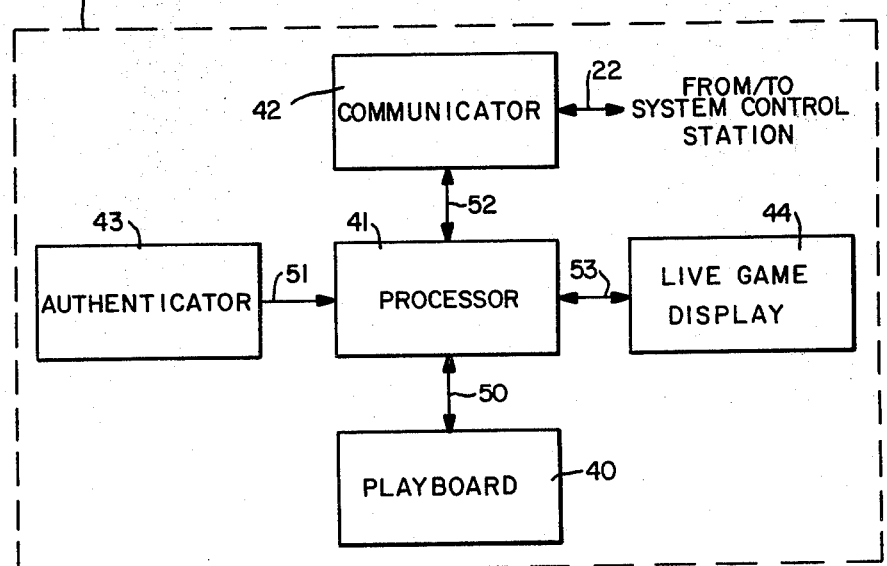
FIG.—2

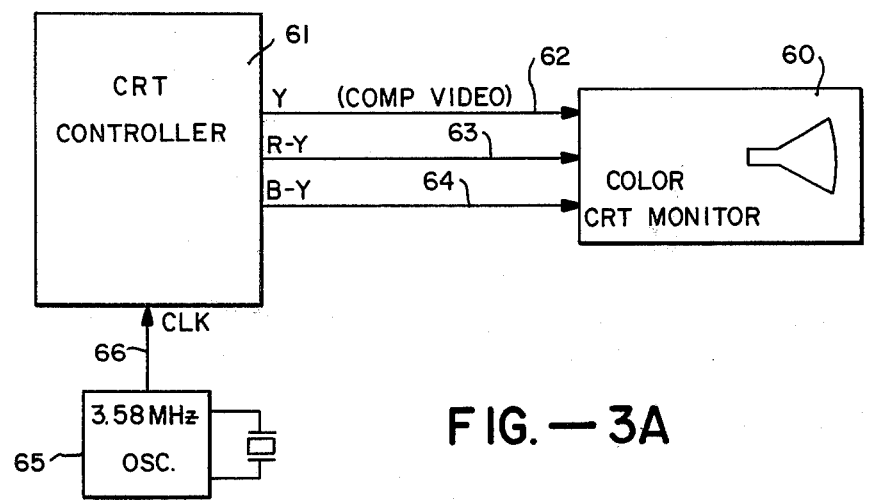
FIG.—3A
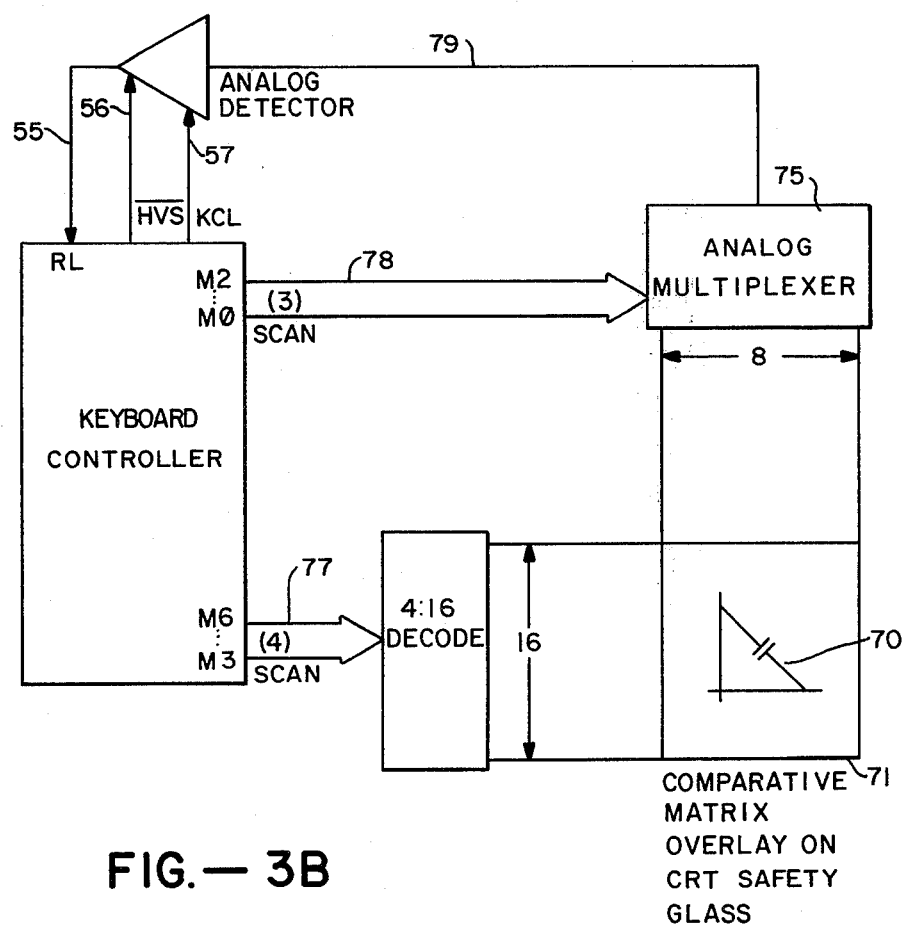
FIG.—3B

ROULETTE

| | | | | | | | | | | | | | |
|---|---|---|---|---|---|---|---|---|---|---|---|---|---|
| 00 | 3 | 6 | 9 | 12 | 15 | 18 | 21 | 24 | 27 | 30 | 33 | 36 | 3RD COLUMN |
|  | 2 | 5 | 8 | 11 | 14 | 17 | 20 | 23 | 26 | 29 | 32 | 35 | 2ND COLUMN |
| 0 | 1 | 4 | 7 | 10 | 13 | 16 | 19 | 22 | 25 | 28 | 31 | 34 | 1ST COLUMN |
| | FIRST DOZEN | | | SECOND DOZEN | | | | THIRD DOZEN | | | | | |
| | 1-18 | ODD | | RED | | BLACK | | EVEN | | 19-36 | | | |

- YOU HAVE
- ODDS THIS BET
- EXCEEDED CASH AVAILABLE
- CANCEL ALL BETS THIS PLAY
- UNIT AMOUNT
- NUMBER OF UNITS
- ENTER
- 15 SECONDS TO CLOSE

CRAPS

YOU HAVE

ODDS THIS BET

EXCEEDED CASH AVAILABLE

CANCEL ALL BETS THIS PLAY

UNIT AMOUNT

NUMBER OF UNITS

ENTER

15 SECONDS TO CLOSE

| DON'T COME BAR | 4 | 5 | SIX | 8 | NINE | 10 | | 9 TO 1 | 7 TO 1 | 30 TO 1 | 30 TO 1 |
|---|---|---|---|---|---|---|---|---|---|---|---|
| DON'T PASS BAR | COME | | PAYS 2 TO 1 ← 2·3·4·9·10·11·12 PAYS 2 TO 1 → FIELD | | | | | 9 TO 1 | 7 TO 1 | 30 TO 1 ANY CRAPS | ANY SEVEN 4 TO 1 |
| BIG 6 | BIG 8 | | PASS LINE | | | | | 15 TO 1 | 15 TO 1 | | 7 TO 1 |

20-2

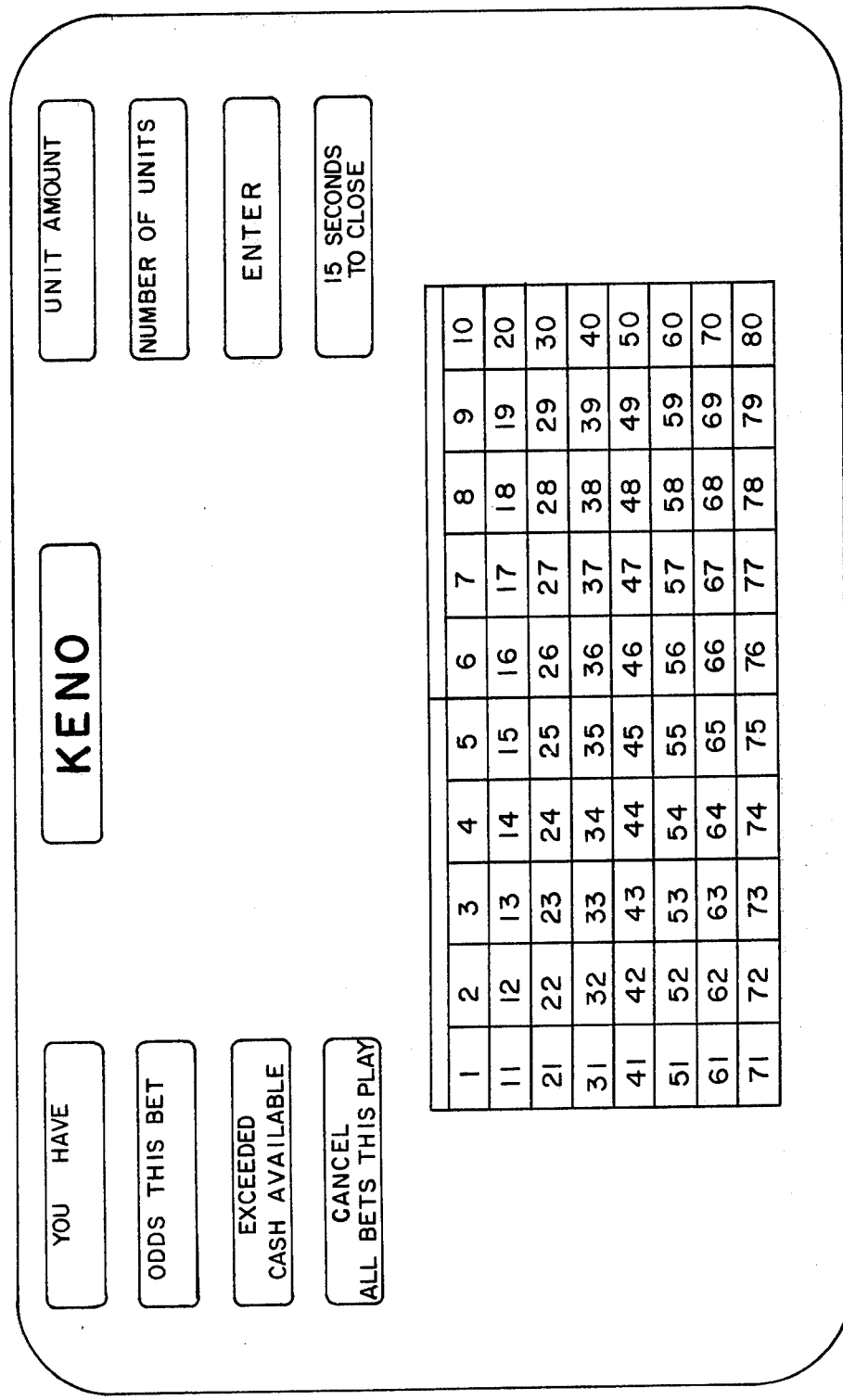
FIG.—6

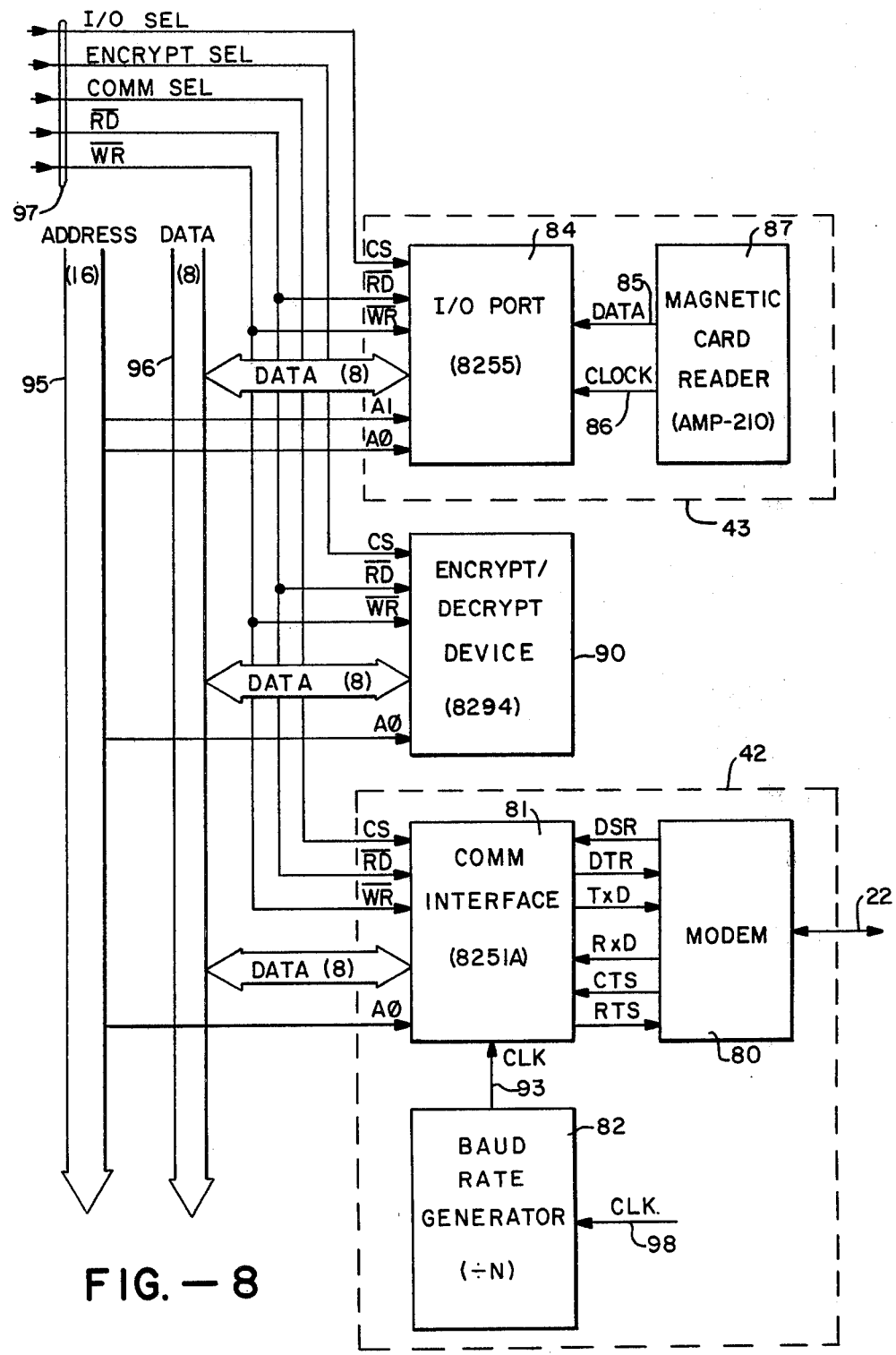
FIG.—8

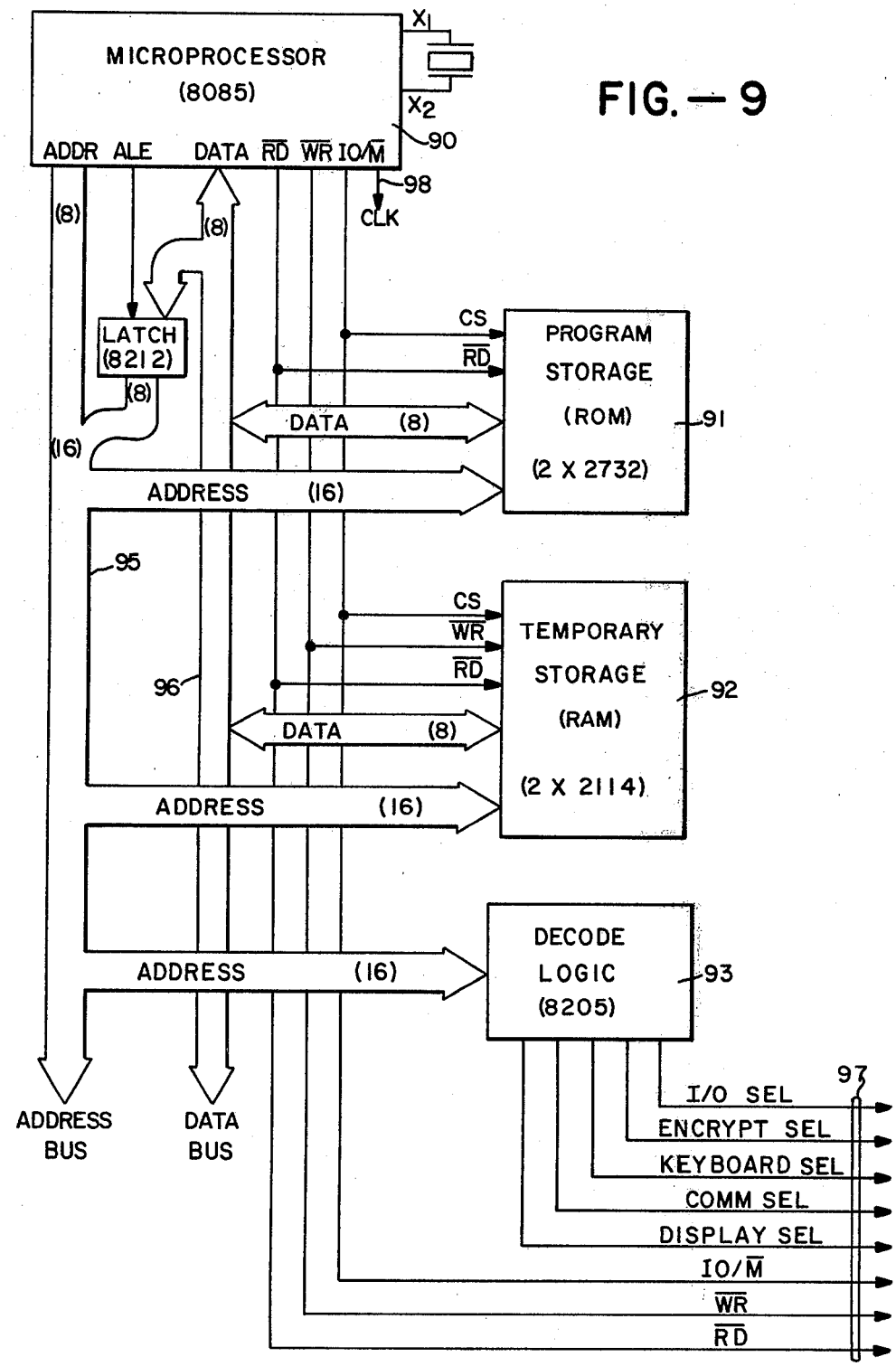

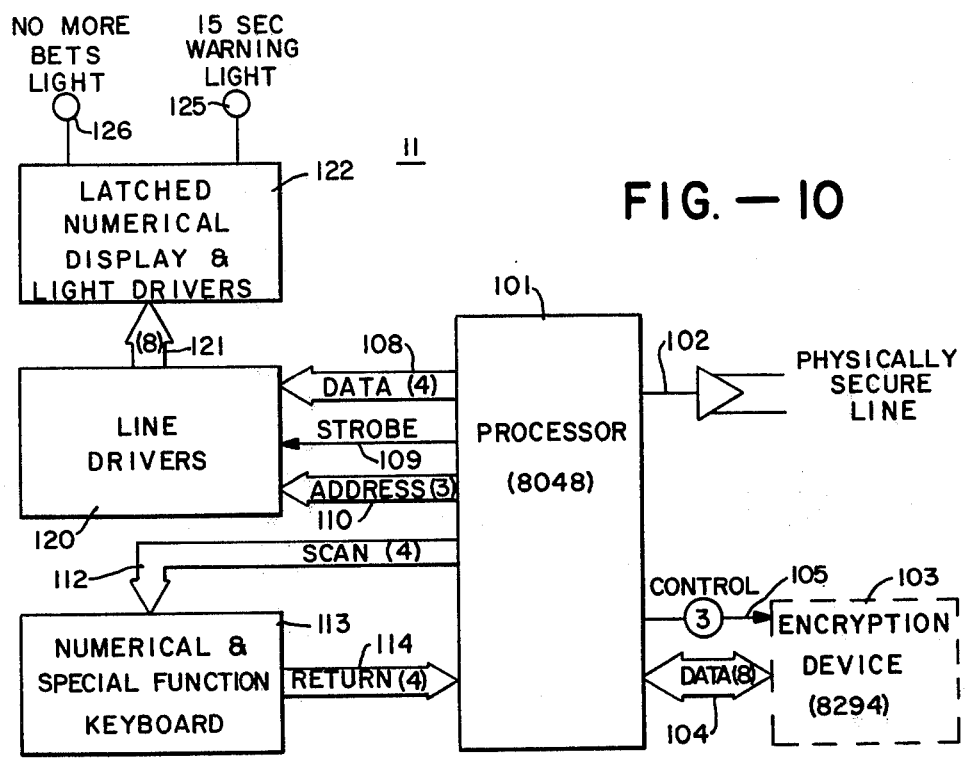
FIG.—10
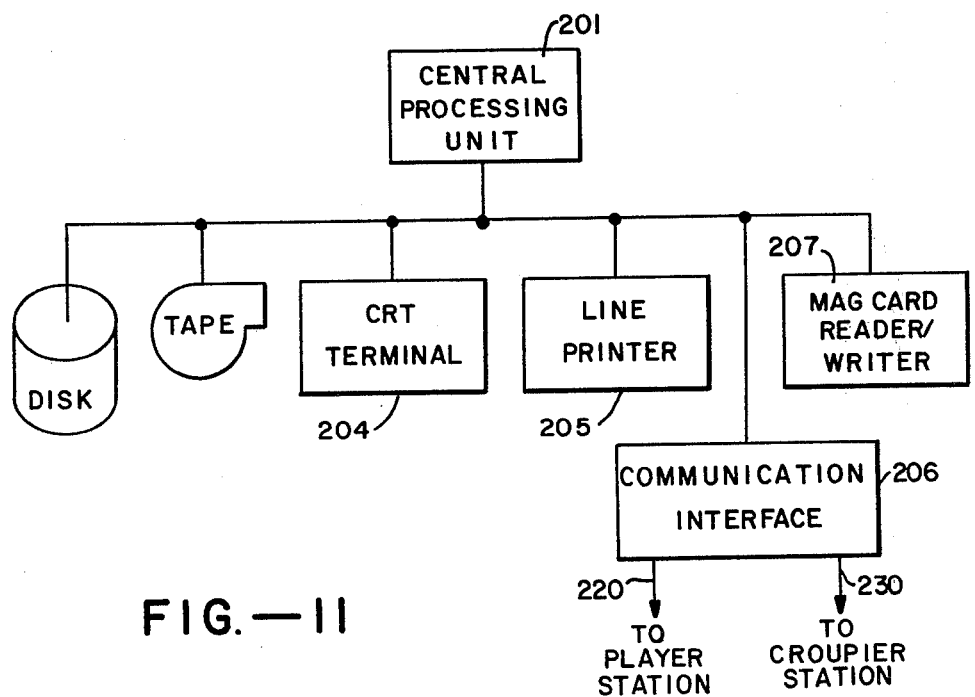
FIG.—11

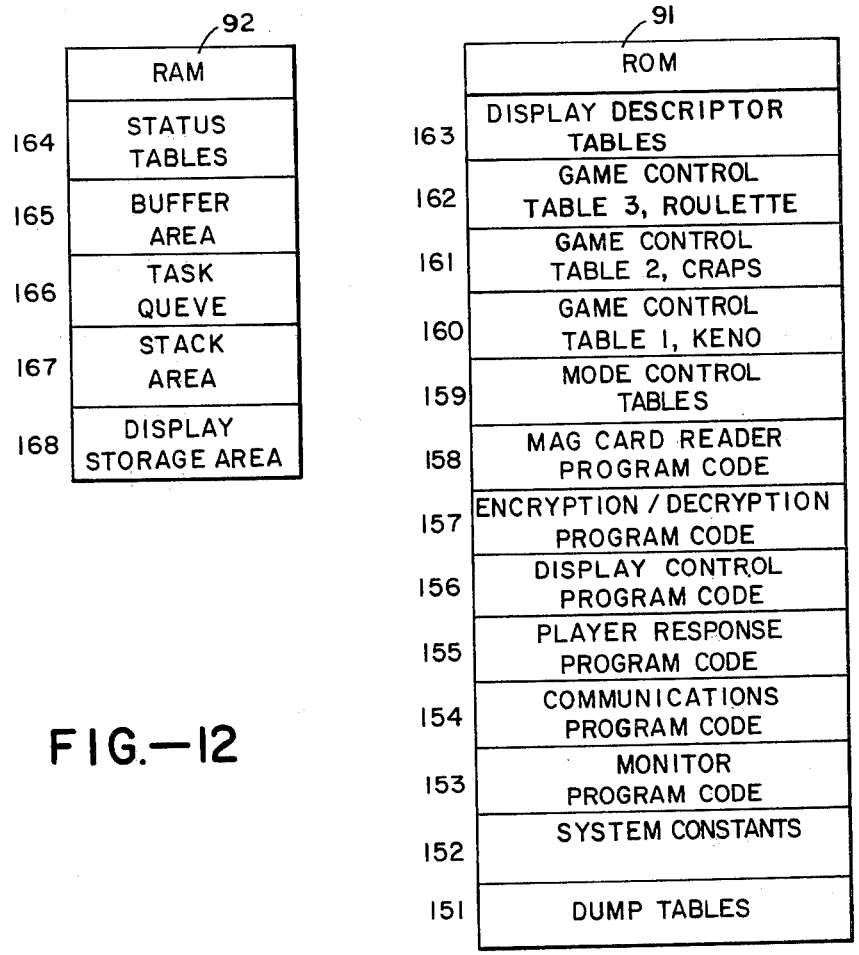
FIG.—12
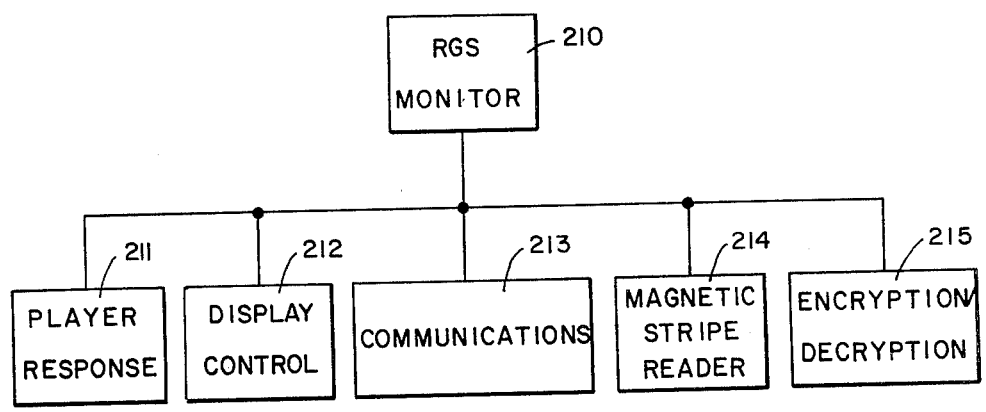
FIG.—13

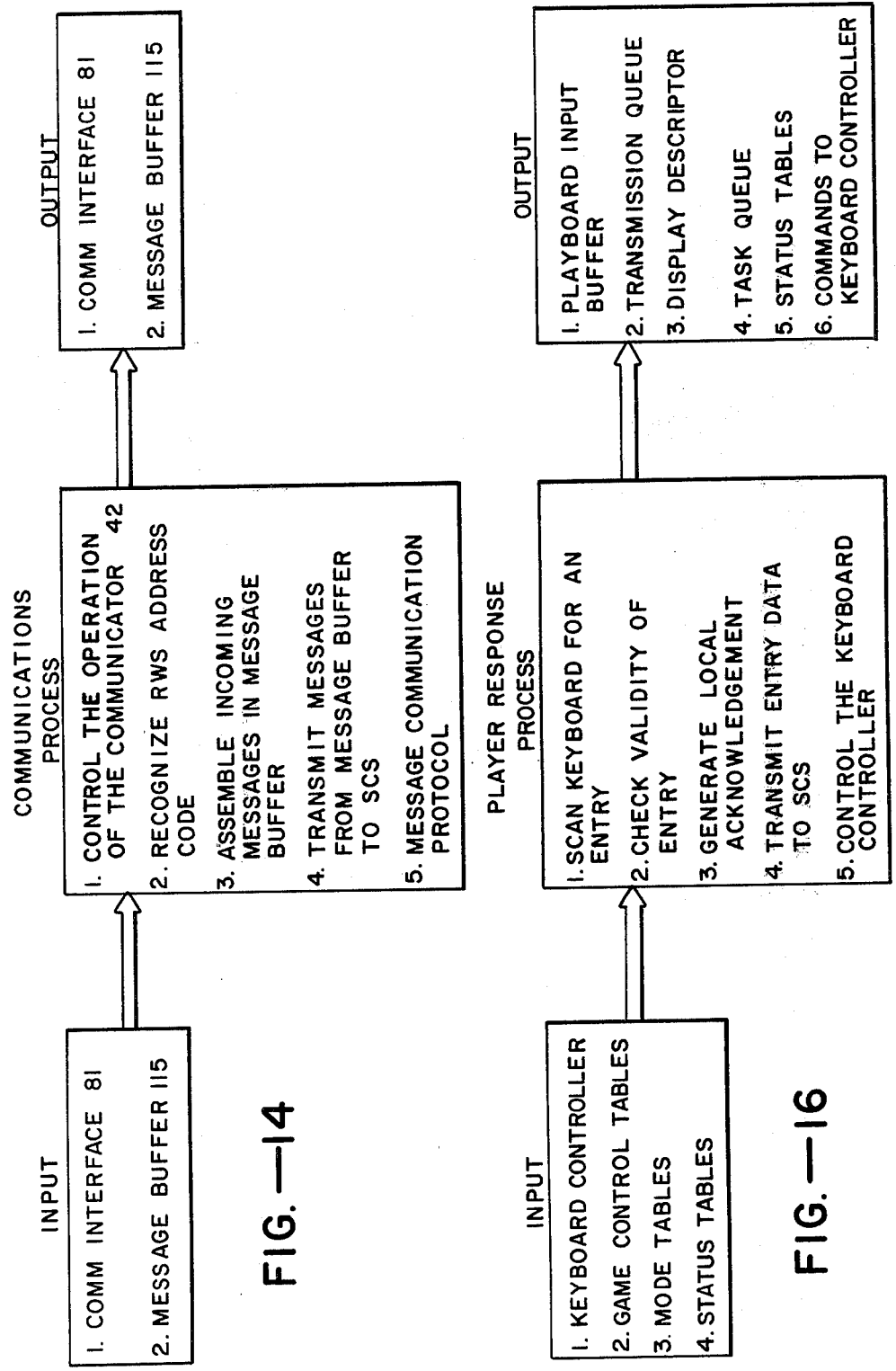

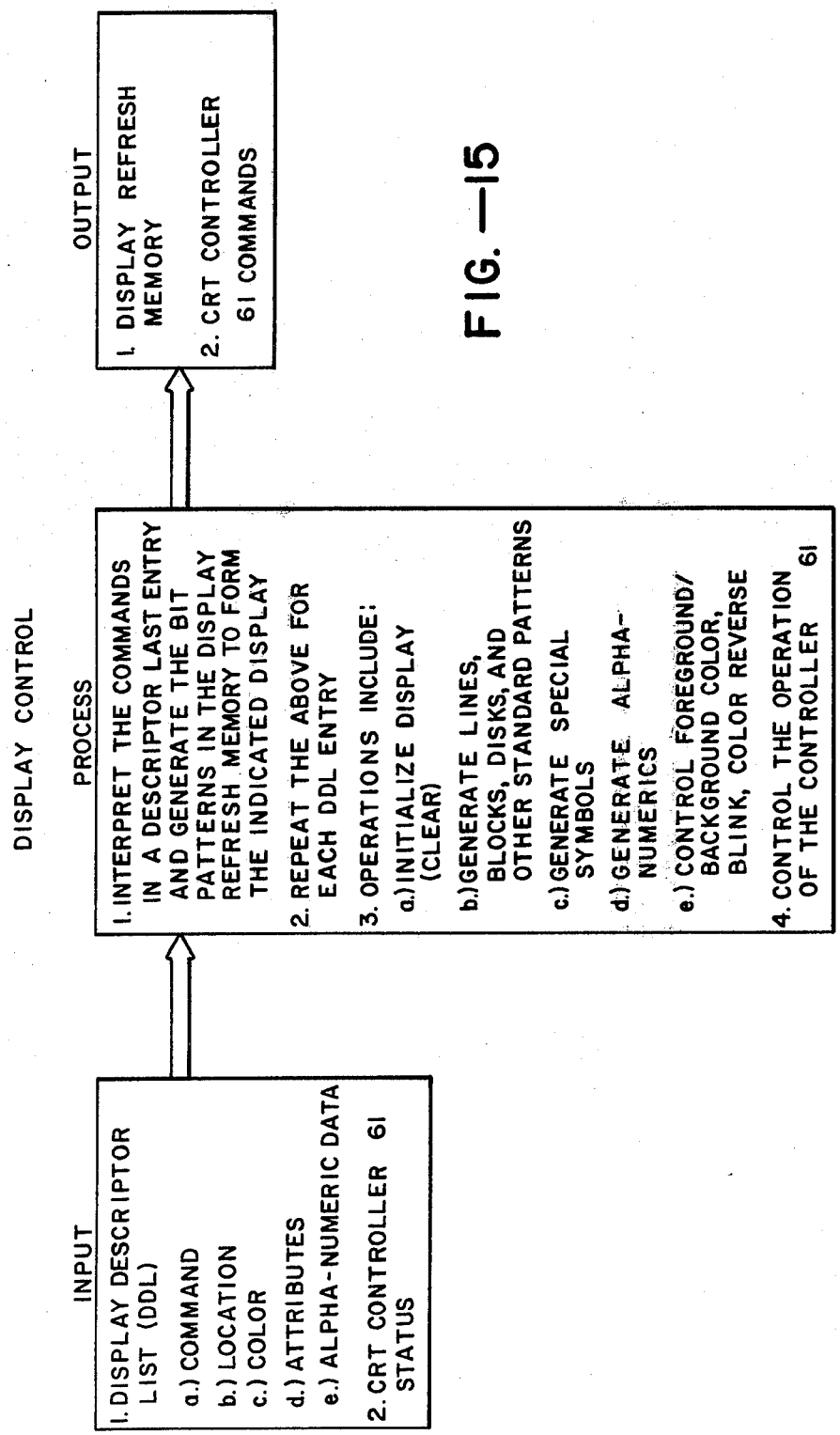
FIG.—15

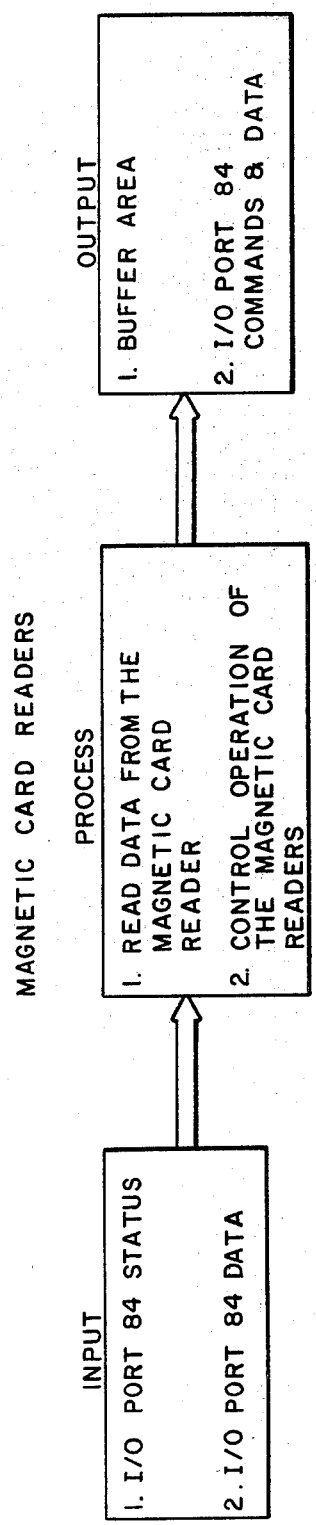
FIG.—17
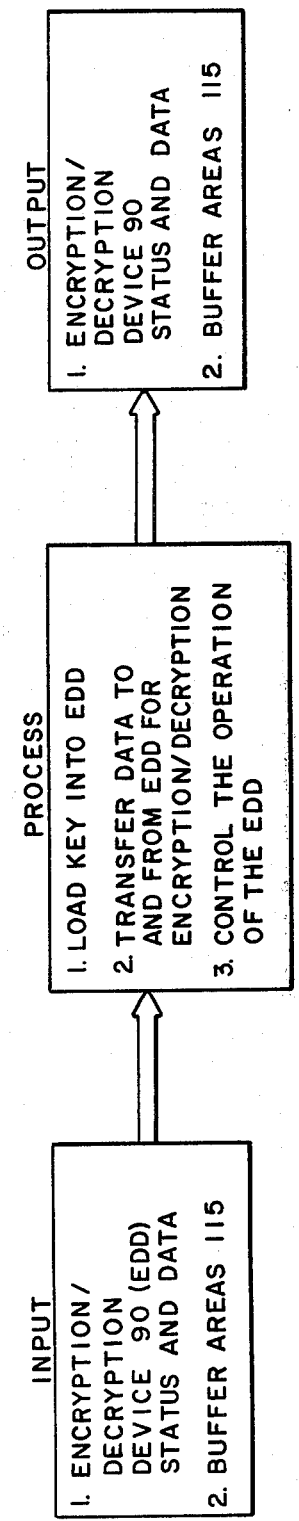
FIG.—18

REMOTE GAMING SYSTEM

BACKGROUND OF THE INVENTION

The present invention relates to a remote gaming system for use with a wagering or gambling establishment such as a casino.

Heretofore, it has not in general been possible for a player to participate in wagering games such as roulette, craps or keno from a remote location because of the difficulty involved in maintaining communications with the various games, together with maintaining accurate results of each of the games for each player. For example, U.S. Pat. No. 3,810,627 discloses the capability of enabling a player to place a wager on a game from a remote location, but does not provide the capability of allowing the same player to place a wager on another game.

In order to place wagers on any one of a group of ongoing games such as roulette or craps at a casino, it is usually necessary that a player be physically present at the gaming table itself.

Moreover, some players would enjoy participating in such games but are reluctant to be directly involved at the gaming table themselves. A desirable feature of a remote wagering system would be to allow a player to participate in wagering games from the convenience and privacy of his room at a casino or, for that matter, from a hotel or motel room remotely located from the casino.

In view of the above background, it is an objective of the present invention to provide an improved remote gaming system.

SUMMARY OF THE INVENTION

The present invention relates to a remote gaming system for use with a wagering or gambling establishment such as a casino to enable a player's participation from a remote location.

In one embodiment, the system includes a croupier station, a credit station and a player station remotely located from the croupier station and the credit station. The player station includes means for enabling the player to communicate with the croupier station, a live game display for displaying a selected one of a plurality of games being played at the croupier station (such as roulette, craps or keno), playboard means for displaying a selected one of a plurality of wagering possibilities corresponding to the selected one of said plurality of games being played at said croupier station and for displaying the results of the game played at said croupier station, and processor means for controlling the operation of the player station.

The credit station includes means for enabling the player station to communicate with the croupier station upon determination that a player is authorized to participate in the wagering games in the casino with a predetermined credit limit thereby permitting participation by one or more players in a selected one of a plurality of games from remote locations.

In accordance with another embodiment of the present invention, a remote gaming terminal is provided which includes a live game display for displaying a selected one of a plurality of games being played such as craps, roulette or keno. The terminal also includes a playboard for displaying a selected one of a plurality of wagering possibilities corresponding to a selected one of a plurality of games being played. The playboard also displays the results of the game played upon completion. The playboard includes means for changing the display to enable participation in any of the games being played. Processor means are included for controlling the operation of the terminal.

In accordance with another embodiment of the present invention, the system also includes authenticator means for verifying that the particular player is authorized to be played with the selected game in progress which prevents unauthorized access to the game in progress, thereby providing a security aspect for the terminal.

In accordance with the above summary, the present invention achieves the objective of providing a remote gaming system and terminal for use in a gambling establishment for providing participation in wagering on a plurality of live games from a remote location.

Other objects and features of the present invention will become apparent from the following description when taken in conjunction with the accompanying drawings.

BRIEF DESCRIPTION OF THE DRAWINGS

FIG. 1 depicts a block diagram of a remote gaming system according to the present invention.

FIG. 2 depicts a block diagram of a remote gaming terminal which forms a portion of FIG. 1.

FIG. 3A depicts a block diagram showing the implementation of a playboard display.

FIG. 3B depicts a block diagram showing the implementation of a keyboard controller for a playboard. Together these Figures depict the implementation of a playboard which forms a portion of FIG. 2.

FIG. 4 depicts a diagram of the game of roulette which can be displayed on the playboard of FIG. 2.

FIG. 5 depicts a diagram of the game of craps which can be displayed on the playboard of FIG. 2.

FIG. 6 depicts a diagram of the game of keno which can be displayed on the playboard of FIG. 2.

FIG. 8 depicts a schematic diagram of a communicator and authenticator which forms a portion of FIG. 2.

FIG. 9 depicts a schematic diagram of a processor which forms a portion of FIG. 2.

FIG. 10 depicts a diagram of a croupier station which forms a portion of FIG. 1.

FIG. 11 depicts a diagram of a credit station which forms a portion of FIG. 1.

FIG. 12 depicts the organization of data structures in the random access memory and read only memory which form a portion of FIG. 9.

FIG. 13 depicts the organization of program modules for controlling the operation of the remote gaming terminal of FIG. 2.

FIGS. 14–18 depict more detailed diagrams of the program modules of FIG. 13.

DETAILED DESCRIPTION OF THE DRAWINGS

Figure 7:
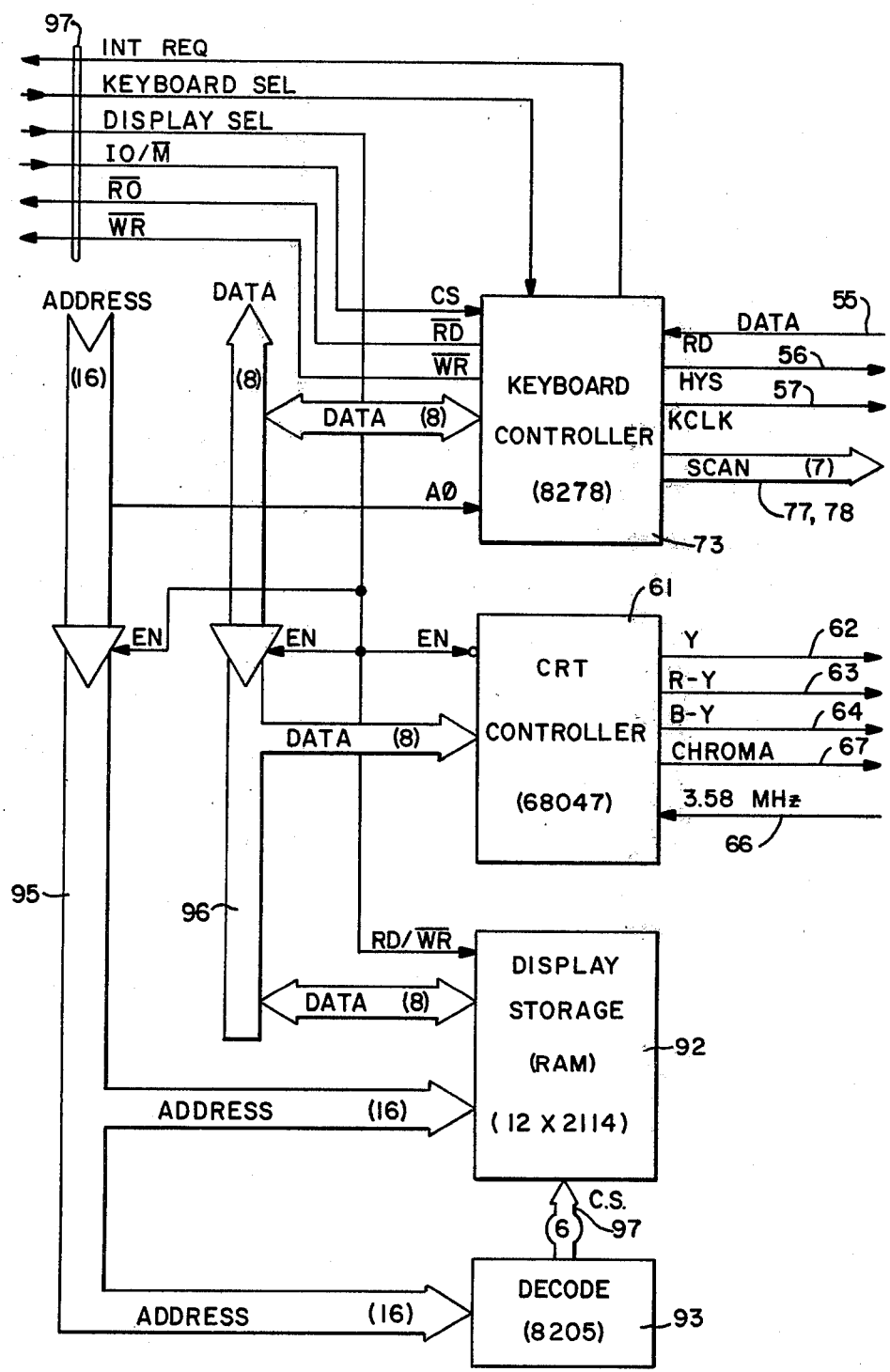
FIG. 7 depicts a schematic diagram of a playboard controller which forms a portion of FIG. 2.

Referring now to FIG. 1, a system block diagram of a remote gaming system is depicted which includes a credit station 9, a croupier station 11 and a player station 10.

The player station 10 includes a playboard 20 which displays, as will be described, the particular game in progress which the player will observe by watching typical TV monitor 21. Playboard 20 and monitor 21 are connected to and communicate with the casino station 11 by digital coaxial bus 22.

The croupier station 11 includes one or more gaming tables 8 which are monitored by TV cameras 12, 13, which provide to player station 10 a display of a game in progress via modulator 14 and coaxial bus 22 to display monitor 21 at the player station 10. Typically, the games which can be displayed at player station 10 are craps, keno and roulette, although other games can be displayed.

The credit station 9 includes a minicomputer 32 connected to modulator 14 via bus 19 and to the croupier station 11 via buses 17, 18 which are connected to casino display monitors 15, 16 respectively. Credit station 9 is also connected to player station 10 via coaxial bus 22 to monitor 30 and bus 31.

Referring now to FIG. 2, a block diagram of a remote gaming terminal 20 of FIG. 1 is depicted which includes a live game display 44, playboard 40, authenticator 43, communicator 42 and processor 41 for controlling the operation of the remote gaming terminal (RGT) 20.

The live game display 44 includes a remotely controlled color television monitor such as monitor 21 of FIG. 1, which is connected by a standard closed circuit TV coaxial cable system 22 as depicted in FIG. 1, which is in turn connected to TV cameras 12, 13 placed to monitor live wagering games in progress at a selected one of a plurality of croupier stations in the casino.

The TV signals are transmitted over cable 22 using standard cable-TV frequencies and modulation techniques through modulator 14 whereby monitor 21 can receive and select the desired game at the playing station 10 of FIG. 1. Monitor 21 can be equipped with a remote control so tht the player may remotely select a game to be played. The remote control device is part of the playboard 40 of the RGT 20 and is connected via bus interface to the processor via bus 50, as described below.

The playboard 40 of FIG. 2 is depicted in more detail in FIGS. 3A and 3B and includes means for displaying the wagering possibilities as well as the results of the game, means to accept the wagers intended by the player and means to interface the playboard with the processor 41 of FIG. 2.

The player-changeable playboard 40 the implementation of which is shown FIGS. 3A and 3B, provides a single physical entity which may be rapidly and automatically controlled by the processor 41 of FIG. 2 to allow a player to play any of a plurality of games in progress at a casino.

For example, the playboard allows wagering on games such as craps, roulette and keno. The use of several playboards, one for each game, would be expensive, cumbersome, and confusing to a player, and as a result the playboard depicted in FIGS. 3A and 3B allows for a plurality of games to be rapidly and automatically changed by a processor means 41 of FIG. 2 when it receives a command from the player that a new game has been selected.

In one embodiment, the changeable playboard FIGS. 3A and 3B includes color TV monitor 60 connected via buses 62, 63, 64 to CRT controller 61, which typically is Motorola's Model 68047, which in turn is connected to the processor 41 of FIG. 2.

Controller 61 generates a composite video signal on buses 62, 63, 64 which contains all necessary components such as luminence, chrominace and synchronization to display a particular game on monitor 60. Clock signals on bus 66 are provided by clock circuit 65, which in one embodiment could be a 3.58 MHz oscillator.

An example of a display to be displayed on monitor 60 is a roulette game depicted in FIG. 4, which contains blocks of different colors for displaying possible wagers in a format which simulates the format of a playing board in the live game selected. Display monitor 60 also displays items relative to the player's account such as total credit remaining and items pertinent to the game such as wagering limits, payoff odds, and time remaining in which to enter a bet.

In FIG. 7, controller 61 generates the display under control of a sequence of control bytes of data which are stored in a display storage memory 92. Both the processor 41 and controller 61 have the ability to access the display storage memory 92 via data bus 96. Processor 41 stores the appropriate control bytes into the display storage memory via address bus 95, 97 and decode logic 93, as determined by the game selected and the subsequent play of the game. Controller 61 of FIG. 3A reads the stored data from display storage memory 92 of FIG. 7 once every 1/30th of a second and generates the appropriate TV signals on buses 62–64, 67 to cause the display of the particular game selected on monitor 60 by the processor determined information.

In FIG. 3B, the playboard also includes a touch sensitive keyboard which may take one of several forms. In one embodiment, a matrix 70 of transparent conductors are printed on a sheet of safety glass 71 which in turn is mounted over monitor 60 so that each colored block in the display lies immediately beneath at least one matrix cross point. A player touching what appears to be colored blocks such as to place a bet on a particular number in roulette in FIG. 4 will acutally press a corresponding overlay depress point 70 of FIG. 3B. The cross points are periodically scanned at a high rate by a keyboard controller 73 such as Intel's 8278. The principles of operation of controller 73 are described briefly below.

Bus 77 is a 4-bit bus which scans display digits and provides a column scan to keyboard controller 73 via a 4 to 16 decoder 72. Bus 78 is a 3-bit bus used to multiplex the row return line back to controller 73 via analog multiplexer 75, analog detector 74 and buses 79, 55, which is an input from multiplexer 75 to indicate whether the key currently being scanned is closed. Buses 56, 57 indicate, respectively, a hysteresis output to analog detector 74 and key clock output to analog detector 74 used to reset the detector 74 before scanning a key.

When a player touches a cross point, the capacitance of transparent conductor 70 is changed, which is sensed by keyboard controller 73, which notes the position of the player's touch and informs processor 41 of FIG. 2 that a new command is being generated by the player. This is done by generating a suitable logic level on an interrupt line to processor 41 which reads the encoded position of the player's touch by sending a read command to the keyboard controller 73 and capturing the resulting data which controller 73 places on a data bus.

To change from one game to another, only the display on monitor 60 need be changed. For each game, the display is generated so that the displayed blocks always underlie matrix cross points 70 of FIG. 3B. Processor 41 interprets a player's touch of a particular location differently for each keyboard displayed such as depicted in FIG. 4 (for roulette), FIG. 5 (for craps), and FIG. 6 (for keno). The remote wagering terminal therefore provides means to rapidly and automatically reconfigure a single physical playboard to serve for displaying a plurality of possible games as depicted in FIGS. 4-6. The authenticator 43 of FIG. 2 is depicted in more detail in FIG. 8 and provides means to verify that a player is authorized to use the remote gaming terminal.

In FIG. 8, the authenticator 43 includes a magnetic card reader 87 (typically AMP-210) which scans magnetically encoded data on a plastic card. As depicted in FIG. 8 the card reader 87 is connected to processor 41 of FIG. 2 via I/O port 84, which could be Intel's Model 8255. I/O port 84 reads the logic level on input line 85, 86 (which are data and clock signals, respectively) from card reader 80 and places data on data bus 96 upon command on bus 97 from processor 41 of FIG. 2. In a preferred embodiment, processor 41 periodically reads the I/O port 84 at a rate exceeding the highest clock rate on bus 86 from card reader 87. When the clock signal makes a transition from low logic level to high logic level, I/O port 84 reads and saves the data in data bus 85 from the card reader 80. Processor 41 communicates the sequence of data bits to the credit station 9 of FIG. 1 where the sequence is compared to sequences on file. If a match is found, a test command is sent back to processor 41 which causes a display of a set of tests for the player. These tests may require, for example, the player to spell out a particular predetermined word, to give a predetermined number, or to generate any predetermined sequence of matrix cross point locations. Processor 41 displays a suitable key work number under a matrix cross point of FIG. 3B and the player's response to the test is communicates to the system or credit control station 9 where it is compared to a predetermined sequence. If it matches, the player is entered into the system and the RGT 20 of FIG. 2 is enabled. If it does not match, an alarm is generated and the RGT 20 of FIG. 2 is disabled from further play.

In other embodiments of the present invention, the test sequence may be omitted in which case the match of the credit card number provides authorization for the player and the RGT 20 is enabled.

In FIG. 8, the communicator 42 of FIG. 2 is depicted in more detail and provides a means of secure communication between the processor 41 of RGT 20 and the system credit station 9.

Communicator 42 includes a modem 80, a baud rate generator 82, and a communications interface 81. The modem 80 could be a standard telephone line modem such as marketed by Bell Telephone System or as specified in the CCITT and serves to convert the digital signals from processor 41 into analog signals suitable for transmission over telephone lines or other two-line conductors such as bus 22.

Baud rate generator 82 generates a clock signal on bus 83 at the bit rate for which modem 80 is designed, which could be 1200 bits per second or 2400 bits per second, depending upon the number of remote gaming terminals connected to the system. Baud rate generator 82 also includes a digital divider which outputs one pulse per every N pulses input. The digital divider is provided with a fast clock signal on bus 98 which may be from a separate oscillator or could be a processor clock if chosen as a multiple of 2400 bits per second.

Communications interface 81 is an interface between the modem 80 and processor 41 and is typically Intel's Model 8251A. Interface 81 accepts data on bus 96 from the processor eight bits at a time on command from the processor 41 and temporarily stores data, outputting data one bit at a time sequentially to modem 80 in synchronism with the baud rate clock on bus 83. Interface 81 also accepts data sequentially from modem 80 and stores it until eight bits have been received which are then transmitted to processor over the data bus 96 upon demand.

In FIG. 8, an encryption/decryption device 90 provides further means to insure that data communicated between the remote gaming terminal 20 and the system or credit control station are not tampered with by unauthorized sources. As implemented, the device 90 is typically an Intel 8294 which is designed to implement the National Bureau of Standards encryption algorithm and accepts data on bus 96 from processor 41 in 8-bit bytes. Processor 41 provides a 56-bit key to the device 90 and sends a mode control encryption or decryption signal on bus 97 together with data on bus 96 to be encrypted or decrypted as required.

Device 90 applies the encryption or decryption algorithm to generate the appropriate data and transmits the data on bus 96 to the processor upon command. All data transmitted to the credit station is encrypted prior to its transmission. All data received from the credit station is decrypted prior to its use by processor 41.

Referring now to FIG. 9, the processor 41 of FIG. 2 is depicted in more detail and includes typically Intel's 8085 microprocessor 90 to provide computing power, read only memory (ROM) 91 to provide sufficient storage to hold the remote gaming terminal software and random access memory (RAM) 92 to hold temporary results of processing. Also included is decode logic 93 to provide means to access the playboard and communications devices by providing control signals on a portion of bus 97.

ROM 91, RAM 92 and logic 93 are each connected to microprocessor 90 via address bus 95, data bus 96 and control bus 97. Address bus 95 is 16 bits-wide allowing access to $2^{16}$ locations in memories 91, 92. Data bus 96 is 8-bits wide as all data is transferred via 8-bit increments or bytes. Control bus 97 provides control signals which indicate to all devices in the system whether the particular device being addressed by address bus 95 is commanded to accept data (write operation) or to place data on the data bus for connection to the processor 90 (read operation).

Processor 90 controls the address and control buses 95, 97 respectively. During a write cycle, processor 90 places data on the data bus and during a read cycle the device being addressed places data on bus 96. When the playboard or communications devices are being addressed by processor 90, the appropriate addresses are decoded and a signal selecting the address device is generated on bus 97 by logic 93. Control signals from logic 93 are output on bus 97 and include display select, communications select, keyboard select, encryption select and I/O port select.

DESCRIPTION OF THE CROUPIER STATION SECTION

Referring now to FIG. 10, the croupier station 11 of FIG. 1 is depicted in more detail. Croupier station 11 provides a means for the croupier to input the results of the game to the credit terminal or credit station 9 of FIG. 1. The croupier station 11 also provides means for displaying the results of the game played at the croupier station.

Croupier station 11 of FIG. 10 includes a processor 101 (typically Intel's 8048) connected to bus 102, which is a physically secure line for providing secure communication to the credit station. Processor 101 is connected via 4-bit bus 112 to a numerical and special function keyboard 113. Return information from keyboard 113 is input to processor 101 via 4-bit return bus 114.

Croupier station 11 also includes a line driver circuit 120 connected to processor 101 via 4-bit data bus 108, strobe bus 109, and 3-bit address bus 110. Line drivers 120 are connected to a latched numerical display and light driver 122 via 8-bit bus 121. Driver circuit 122 is connected to a "15-SECOND" warning light 125 and a "NO MORE BETS" light 126.

Processor 101 scans keyboard 113 periodically to detect key closures. When a key closure is detected, processor 101 decodes the key which was closed via active scan line 112 and active return line 114. The key closure is used to activate the display as explained below.

The key closure code is transmitted by processor 101 over a physically secure line 102 to the credit terminal. A physically secure line 102 is provided between the credit terminal and the croupier station to prevent deceptive transmission of false game results.

In an alternative implementation, an encryption device 103, such as Intel 8294, may be used when physical security of the communication line cannot be guaranteed. Device 103 is connected to processor 101 via 8-bit data line 104 and 3-bit control line 105.

Keyboard 113 includes a set of ten switches labeled with the numbers 0, 1, 2, ..., 9, and special function switches labeled "ENTER," "START," "ERASE," "15 SEC TO BET" and "NO MORE BETTING." The numerical switches are used to enter the results of the game.

For example, in roulette, the croupier enters the digits of the numbers upon which the ball lands. For craps, the match point and result of each throw are entered. Processor 101 displays the number entered on display 122. If it is correct, the croupier presses "ENTER" and processor 101 then sends the number to the credit terminal. If the croupier makes a mistake, he can correct it by using the "ERASE" key. The "15 SEC TO BET" and "NO MORE BETS" keys are depressed by the croupier at the appropriate time. The warnings are automatically sent to the credit terminal and relayed to the remote gaming terminals.

Display 122 includes one (roulette) or two (craps) two-digit numerical displays and two warning lights 125,126. Display 122 is large enough and located so that the result entered by the croupier will be readily visible to the croupier, the players at the gaming table, the pit boss, and the closed circuit TV camera depicted in FIG. 1 which provides visual results to the remote gaming terminals.

The key elements of the croupier station contributing to system security are the secure communication means 102 or 103 and the large display 122.

Without secure communication, it might be possible to break the line and enter a fraudulent result into the credit terminal. This could be done to result in incorrect payoffs to all players of a certain game.

Normally, one or more players would notice and complain; however, it is conceivable that only a few players might be playing and all could be in collusion. Display 122 and particularly the large display of the results prevents either purposeful or accidental error on the part of the croupier which might result in an incorrect payoff. The croupier must make an error unnoticed by anyone viewing the display for the error to be effective.

DESCRIPTION OF THE CREDIT STATION

Referring now to FIG. 11, the credit station 9 of FIG. 1 is depicted in more detail. The credit station performs the following functions in the system:
1. Issues credit cards to users.
2. Establishes user accounts.
3. Verifies authentication of the player station users.
4. Accepts commands from users through a player station to
    (a) select game;
    (b) place wager.
5. Accepts game results from croupier station.
6. Posts results to user's account.
7. Sends results to player station for display to user.

To accomplish the above functions, the credit station is configured as shown in FIG. 11 and includes a central processing unit (CPU) 201 and a variety of peripheral devices including a magnetic disk temporary storage unit 202, a magnetic tape archival storage unit 203, a CRT terminal 204 (for the credit operator), a magnetic card reader/writer 207, a line printer 205. and a set of communication interfaces 206, which are connected to the player station and croupier station via buses 220, 230 respectively.

CPU 201 is connected to the above identified peripheral via common bus 210. Typically, CPU 201 and the peripherals 202-207 are manufactured by Data General (Nova and Eclipse Minicomputer Systems) or Digital Equipment Corporation (PDP-11/60 Minicomputer System). Redundant CPU and disks assure reliable operation.

CPU 201 provides the means to accept message from each of the peripheral devices, process the data contained in the messages, generates messages for each peripheral and sends the message to the peripheral device via common bus 210.

Disk 202 provides means to store data describing the credit accounts for short periods of time. Magnetic tape unit 203 provides means to store data describing the accounts for longer periods of time.

Line printer 205 provides means to print out the results of system operation and also provides means to generate a printed record of individual account activity.

CRT terminal 204 provides means for system control by a credit operator.

Magnetic card reader/writer 207 provides means to generate credit cards with suitable information encoded magnetically. Information is used by the remote gaming system to verify the authenticity of the system user.

Communication interface 206 provides means for communication with croupier stations via bus 230 and the player stations via bus 220.

REMOTE GAMING TERMINAL SOFTWARE OVERVIEW

The functions of the remote gaming terminal (RGT) are controlled by microprocessor instruction sequences and tables of data which are permanently stored in the Read Only Memory (ROM) 91 of FIG. 9 and hereinafter is referred to as the RGT firmware. The firmware is interpreted by microprocessor 90 in the RGT to cause it to generate the appropriate playboard display, sense commands entered by the player, control the magnetic card reader, communicate with the credit station, and so forth.

The implementation described herein is based upon a standard table-driven multi-tasking approach in which separate firmware program modules are provided to perform each of the general functions required of the RGT, such as reading data from the magnetic card reader 87 of FIG. 8 or sending a message to the credit station or croupier station.

The specific operation of the system in response to a stimulus from the credit station or the player is determined by these program modules in conjunction with tables of data stored in ROM 91 and Random Access Memory (RAM) 92 of FIG. 9. The tables in ROM 91 define the operation of the RGT for each mode of operation and game while the tables in RAM 92 contain information about the current state of operation of the RGT. Since certain operations are more important, or must be performed more rapidly than others, a prioritized list of tasks (the task queue) to be performed is maintained in RAM 92 of FIG. 9. One program module, the monitor, serves to coordinate the activities of processor 90 by crediting entries in the task queue and transferring control to the appropriate program module in response to stimuli to the RGT and in accordance with the rules of operation represented by the data in the tables.

FIG. 12 illustrates how the ROM 91 and RAM 92 of FIG. 9 are used for the RGT. ROM 91 is assigned addresses beginning with zero and increasing to address 32767. RAM 92 is assigned the addresses from 32767 to 65535, the highest available address for this particular implementation. One area of ROM 91 contains jump tables 151 which constitute a directory of the addresses of various tables, program module entry addresses and buffer areas, both in ROM 91 and RAM 92. Entries in this table may be instructions, addresses or a combination thereof. A second area contains system constants 152, various numeric values used by the firmware such as the I/O address of the interface 81 and the control word used to place it in operation.

Next, ROM 91 contains processor instruction sequences for each of the program modules 153-158. Each program module has one or more entry addresses associated with it which are stored in jump table 151. Mode control tables 159 contain data which are interpreted by monitor program 153 to define those operations of the RGT not associated with a specific game. A separate set of game control tables exists for each game 160-162 corresponding to keno, craps and roulette, respectively.

The data for a specific game defines the necessary and legal sequence of operations for the RGT and the player associated with that game.

ROM 91 also contains display descriptive of tables 163 comprising data which are interpreted by the display control program 158 to form specific display patterns. These patterns range from small and simple ones such as a square to complex displays such as the entire roulette playboard depicted in FIG. 4.

RAM 91 is used for temporary storage of data which may change during the operation of the RGT. An area is reserved for status tables 164 which defines the current status of the RGT, including information about the mode and game being played and, in conjunction with the mode and game control tables 159-162, defines what the next operations may or must be.

Another area in RAM 92 is used for buffers 165 for the temporary storage of data being used by any of the program modules. For example, when the magnetic card reader program 158 causes a player account ID and encryption key data to be read from the magnetic card reader 87 of FIG. 8 and stored in buffer area 165 of FIG. 12.

The player's encryption key data is held in buffer area 165 for use by the encryption/decryption program 157 and the account ID data is sent to the credit station by the operation of the communications program 154.

A third area in RAM 92 is the task queue 166, which is a list of data maintained and interpreted by monitor program 153 to define all of the operations or tasks currently scheduled to be accomplished by the RGT.

For example, there may be a task to retrieve data from the credit station using the communications program 154, a task to accept data from the player using the player's response program 155 and a task to maintain a blinking display (using the display control program 158) which prompts the player to enter a bet.

A fourth area in RAM 92 is used for a processor stack area 167, which is an area used to temporarily store the status of the processor 90 when it must switch processing from one task to another or call a subroutine. This status data consists of the data stored in internal registers of processor 90 and other data required by the program modules involved.

In the above example, if processor 90 was executing the display control program 156 when a message arrived from the station, interface 81 of FIG. 8 would, in one embodiment, send an interrupt signal to the processor 90. Receipt of this interrupt signal would cause processor 90 to store, or push, its current status on the stack 167 and transfer control to an interrupt processing section of the monitor program 153, which would perform the necessary operations to begin processing the incoming message. In accordance with data in the status tables, mode control tables 159-163 and task queue 157, the monitor 153 might return control to the interrupted display task by restoring processor status from the stack area 167.

DETAILED DESCRIPTION OF THE PROGRAM MODULES

FIG. 13 shows the general organization of the program modules in which RGS monitor 210 serves as a control point for the various program modules based on data stored in tables in RAM 92 and ROM 91. Monitor 210, in the preferred embodiment, is real-time, multitask monitor. The monitor's function can be understood from the overview described above and need not be described in further detail.

Each of the program modules 211-215 of FIG. 13 perform a function directly related to the operation of hardware components of the RGT, sending data to and receiving data from the subject unit. In addition, each program module interacts with the monitor 210 and other program modules by means of data stored in ROM 91 and RAM 92. FIGS. 14-18 indicate the inputs, process functions and outputs for each of these modules.

The communications program modules 213 depicted in FIG. 14 control the operation of the communicator 81 by means of signals sent to and received from interface 81. Upon initialization of the RGT, it reads control data from the system constant area in ROM 91 and transfers this data to interface 81 to place it in the proper mode of operation. The communications program operates to assemble incoming messages from the credit station in a message buffer area 165 in RAM 92 and to transmit messages, stored in a message buffer area by other program modules, to the credit station. This is done under the control of monitor 210.

The communications program module 213 operates in conjunction with the communications interface 81 to manage the communications in accordance with a specified protocol. In the preferred embodiment, this is the IBM SDLC loop protocol.

The functions of the display control program 212 are depicted in FIG. 15 in which the inputs are displaying descriptor lists and the status of the CRT controller 61. The outputs include bit patterns for the display storage area 168 of RAM 92 and commands to direct the operation of the controller 61 of FIG. 3A.

The patterns which appear on the screen of the RGT display 30 are defined by bit patterns in display storage area 168 of RAM 92 and processed by CRT controller 61 of FIG. 3A. The display control program 213 operates on data storage in display descriptor lists which may be in the display descriptor tables 167 and ROM 91 or in a buffer area 168 in RAM 92 in order to generate the appropriate bit pattern for the display storage area 168 of RAM 92. The specific display descriptor lists to process are identified to the display control program by data in buffer area 165 of RAM 92.

The display descriptor lists contain the commands and specifications for characters or other graphic entities to be displayed. The commands include a code for the character figure to be displayed and specifications for its location, size, foreground and background colors and other characteristics such as blink and reverse color. Single commands to the display control tasks such as generate lines, blocks, disks. A sequence of such commands can form a display descriptor list which defines the entire display screen for a given game or operation mode.

In addition to generating the display data as described above, the display control 212 controls the operation of the CRT controller 61 by sending it commands to place in the proper mode of operations.

Th inputs, functions and outputs of the player response program 211 are shown in FIG. 16 in which inputs include data from the keyboard controller 73 and data stored in the mode control tables 159, game control tables 160-163, and status tables 164 of FIG. 12.

The player response program 211 causes the keyboard controller 73 to scan the "keyboard" for an entry.

When the player touches a particular control area on the RGT input panel 71, that event is sensed and a code indicating the location of the touched area is generated. This code is checked against a table of codes for panel locations which are allowed for the game or operational mode currently in effect. If it represents a valid input, local acknowledgment to the player is generated and further inputs are disabled and the input code is transmitted to a credit station. Invalid inputs are disregarded.

The local acknowledgement is accomplished by making entry into the display descriptor table 163 and making an entry into the task queue 166 for the display program. To display an acknowledgement indication, this may be simply to blink the touched area on the screen. The code for the valid touched area is loaded into a message buffer in the buffer area 165 and a task to send it to the credit station is enqueued by making an appropriate entry for the task queue 166 for the communications program. In addition, status tables 164 are modified to the change in RGT status resulting from the player input.

The inputs, functions and outputs of the magnetic card reader program 214 are depicted in FIG. 17 in which inputs are the status of the I/O port 84 and magnetic card data which are passed through the I/O port 84. Data are stored in buffer area 165 for use by other program modules. This program generates the necessary signals to control the magnetic card reader 87 and issues them via I/O port 84.

The inputs, functions and outputs of the encryption/decryption program 215 are depicted in FIG. 18. The program 215 issues the necessary control signals to the encryption/decryption device (EDD) 103 of FIG. 10 to cause it to enable the players encryption key data to be transferred into it from a buffer area 165 in RAM 92 where it has been stored by the magnetic card reader program 214. The EDD program 215 then issues the necessary commands to encrypt or decrypt data stored in message buffer area 165 by applying the National Bureau of Standards standard encryption/decryption algorithm.

DESCRIPTION OF TYPICAL OPERATION

In order to more clearly illustrate the capabilities of the remote gaming system, a cycle of operation is described below in conjunction with the description of FIGS. 1-18.

1. Player establishes credit.

A credit operator at the credit station 9 of FIG. 1 checks the credit and ID of a player using external means to establish the player identity and credit. Credit operator enters the ID and credit amount into the credit station 9 of FIG. 11 via the CRT terminal 204. The credit station firmware accepts data from the CRT terminal 204 and the firmware generates an authentication number for the player. A file is generated for the player in which the player ID, the credit amount and authentication number are written on magnetic disk 202. Also, the location of the file is stored in a directory on magnetic disk 202.

The credit station 11 displays the authentication number on the CRT terminal 204 and writes the identification number on a magnetic card via reader/writer 207 of FIG. 11. The credit operator then issues the magnetic card to the player and explains use of the player station and magnetic card.

2. The player activates player station.

The player inserts the magnetic card into the card reader 87 of FIG. 8 and the firmware reads the card and obtains an ID number. The RGT requests authentication by a display on the player's playboard 40 of FIG. 2.

The player enters the authentication number on the playboard 40 and if correct the software accepts authentication of the player. The terminal then sends the identification and authentication to the credit station 9 of FIG. 1, which searches its directory on disk 202 for the location on file with the correct ID. The file is retrieved from disk 202 on which it was stored previously and the credit station checks the authentication in the file with the received message.

If correct, the credit station 9 sends the approval to proceed to the player station 10; if otherwise, credit station 9 generates an error message requesting the player to retry. After some numbers of retrials, credit station 9 notifies the credit operator via CRT 204 of FIG. 11 and an audible alarm.

If the player station receives authorization to proceed, the player station 10 asks the player for game selection via a message on the playboard 40.

If player station 10 receives a retry message, station 10 asks the player for authentication number via a "prompt" message on the playboard.

Assuming that the player has received authorization, he selects the game via the playboard and the terminal generates an appropriate playboard display for the selected game, such as roulette, craps or keno depicted in FIGS. 4-6, respectively. Terminal 10 also notifies credit station 9 of the game selection.

Terminal 10 enters the game selected and enters the player's ID in the list of the players of the game selected.

3. Game is started.

The croupier at the selected game location clears his croupier station 11 by depressing the start key described in FIG. 10. The croupier station 11 sends the start message to the credit station 9 which also sends commands to the player station 10 to clear the displays for a new game.

Player station 10 receives the message and clears the display and the croupier begins the game at the croupier station 11.

4. The player places a wager.

The player then selects a wager by touching the appropriate area of the playboard 40 and selects the amount of the wager by touching appropriate areas on the playboard 40.

The terminal interprets the wager and amount of entries and feeds back to the player via display on the playboard 40 (e.g., flashing the appropriate area and indicating the amount).

If the player is satisfied with the wager, he touches an area marked "ENTER WAGER" which the terminal then sends the wager and amount to the credit station 9, which receives the message and enters the wager in a temporary file pending the results of the game.

The player may increase, decrease or otherwise change or make multiple wagers until the "NO MORE BETS" signal is displayed on the playboard 40.

5. Game continues to the end.

Fifteen seconds prior to the end of the game, the croupier depresses the "15 SEC TO END" key 125 of FIG. 10 which sends a message to the credit station 10 of the player selecting the game. Player station 10 receives this message and displays it upon the playboard 40 and at the appropriate time the croupier depresses the "NO MORE BETS" key 126 of FIG. 10. This message is sent from the croupier station 11 to credit station 9 and then to player station 10 to be displayed.

At the end of the game, the croupier enters the numerical results of the game on the keyboard 113 of croupier station 11 which sends the message to credit station 9.

Credit station 9 uses the list of players playing the game to locate all appropriate game files and credit files and uses the wagers entered in the playing file with the game results to compute the amount won or lost.

Credit station 9 then credits or debits the player's account and modifies the magnetic disk record 202.

Credit station 9 sends the message to player station 10 indicating a new account balance which is displayed on the playboard 40 of FIG. 2.

6. Player cashes out.

The player upon completion of wagering requests an account termination from the credit operator who verifies the player's identity. Upon proper identification, the credit operator enters the request in credit station 9 via the CRT terminal 204 and retrieves the player's file and prints out an activity record on the line printer 205. The credit operator removes the record and uses it to cash the player out.

What is claimed is:

1. In a remote gaming system, a remote gaming terminal comprising: a live game display for displaying a selected one of a plurality of games being played, changeable playboard means for displaying a selected one of a plurality of wagering possibilities corresponding to said selected one of said plurality of games being played and for displaying the results of the game played, and processor means for controlling said game display and said playboard means, wherein said playboard means includes a television monitor for displaying selected games, a transparent matrix of capacitive switches covering said monitor thereby forming a touch-sensitive keyboard having a plurality of touch-sensitive areas representing a plurality of possible wagers, a monitor controller for generating a composite video signal specified by said processor means representing the selected display to be displayed on said monitor such that each of said touch-sensitive areas representing a possible wager corresponds to at least one of said capacitive switches whereby enabling one of said switches permits wagering of the corresponding possible wager for the game played.

2. A terminal as in claim 1 wherein said monitor controller includes means for generating a plurality of video signals, each representing a selected display corresponding to one of said plurality of games and means for selecting one of said video signals thereby displaying said selected game display.

3. A terminal as in claim 2 wherein said monitor includes means for displaying a specified current credit account for said terminal, means for displaying specified wagering limits for the displayed game, and means for displaying the pay-off odds for the selected game.

4. A terminal as in claim 3 including means for encrypting data to be communicated to said system and means for decrypting encrypted data from said system.

5. A terminal as in claim 3 including first memory means for storing a program of instructions and second memory means for storing data processed by said processor means such that said processor means controls said game display and said playboard means.

6. A remote gaming system comprising: a croupier station for monitoring live game play, a credit station for initiating, monitoring, and terminating a player's wagering account, and a player station for accepting wagers and displaying results of said live game play, said player station being remotely located from said croupier station and said credit station and including means for enabling said player station to communicate with said croupier station, a live game display for displaying a selected one of a plurality of games being played at said croupier station, changeable playboard means for displaying a selected one of a plurality of wagering possibilities corresponding to said selected one of said plurality of games being played at said croupier station and for displaying the results of the game played at said croupier station, and processor means for controlling said enabling means, said live game display, and said changeable playboard means, said credit station including means for enabling said player station to communicate with said croupier, wherein said playboard means includes a television monitor for displaying the selected games, a transparent matrix of capacitive switches covering said monitor thereby forming a touch-sensitive keyboard having a plurality of touch-sensitive areas representing a plurality of possible wagers, a monitor controller for generating a composite video signal specified by said processor means representing the selected display to be displayed on said monitor such that each of said touch-sensitive areas representing a possible wager corresponds to at least one of said capacitive switches whereby enabling one of said switches permits wagering of the corresponding possible wager for the game played.

7. A system as in claim 6 wherein said monitor controller includes means for generating a plurality of video signals, each representing a selected display corresponding to one of said plurality of games and means for selecting one of said video signals thereby displaying said selected game display.

8. A system as in claim 7 wherein said monitor includes means for displaying a specified current credit account for said terminal, means for displaying specified wagering limits for the displayed game, and means for displaying the pay-off odds for the selected game.

9. A system as in claim 8 including means for encrypting data to be communicated to said system and means for decrypting encrypted data from said system.

10. A system as in claim 9 including first memory means for storing a program of instructions and second memory means for storing data processed by said processor means such that said processor means controls said enabling means, said live game display and said changeable playboard means.

* * * * *